United States Patent [19]

Taylor et al.

[11] Patent Number: 5,653,786
[45] Date of Patent: Aug. 5, 1997

[54] HIGH CAPACITY MARINE SEPARATOR

[75] Inventors: David Taylor, Carrollton; Alan A. Hashem, Dallas; Kevin N. Rainey, Arlington; Kenneth J. Fewel, Jr., Dallas, all of Tex.

[73] Assignee: Peerless Manufacturing Company, Dallas, Tex.

[21] Appl. No.: 575,894

[22] Filed: Dec. 20, 1995

Related U.S. Application Data

[63] Continuation of Ser. No. 220,050, Mar. 30, 1994, abandoned.

[51] Int. Cl.⁶ .................................................. B01D 37/00
[52] U.S. Cl. ........................ 95/268; 55/322; 55/325; 55/489; 95/287; 96/190; 96/207
[58] Field of Search ............................ 55/322, 325, 329, 55/332, 426, 489, 516; 95/268, 287; 96/189, 206, 207, 215, 219, 190

[56] References Cited

U.S. PATENT DOCUMENTS

| 1,443,134 | 1/1923 | Klug | 55/489 |
|---|---|---|---|
| 1,513,035 | 10/1924 | Donaldson | 55/426 |
| 1,751,915 | 3/1930 | Hall et al. | |
| 1,771,639 | 7/1930 | Jordahl | |
| 2,384,414 | 9/1945 | Antrim | |
| 2,997,131 | 8/1961 | Fisher | |
| 3,772,858 | 11/1973 | Klugman | 55/503 |
| 3,912,471 | 10/1975 | Cotton, Jr. | 55/440 |
| 4,141,706 | 2/1979 | Regehr | 55/437 |
| 4,234,323 | 11/1980 | Maher | |
| 4,300,918 | 11/1981 | Cary | |
| 4,319,898 | 3/1982 | Maierhofer | 55/322 |
| 4,443,233 | 4/1984 | Moran | |
| 4,787,920 | 11/1988 | Richard | 95/287 |
| 5,057,129 | 10/1991 | Kierzkowski et al. | 55/213 |
| 5,104,431 | 4/1992 | Fewel, Jr. | 55/440 |
| 5,137,555 | 8/1992 | Fewel, Jr. | 55/440 |

FOREIGN PATENT DOCUMENTS

| 0074441 | 9/1981 | European Pat. Off. |
|---|---|---|
| 0085576 | 2/1983 | European Pat. Off. |
| 1370919 | 9/1971 | United Kingdom |
| 1383384 | 4/1972 | United Kingdom |
| 1432337 | 11/1972 | United Kingdom |
| 1444921 | 12/1972 | United Kingdom |
| 2053022 | 5/1980 | United Kingdom |
| 2135210 | 2/1984 | United Kingdom |
| 2136312 | 3/1984 | United Kingdom |
| 2158732 | 5/1985 | United Kingdom |
| 2182582 | 11/1985 | United Kingdom |

*Primary Examiner*—C. Scott Bushey
*Attorney, Agent, or Firm*—Sidley & Austin

[57] ABSTRACT

A high capacity marine separator (30) is disclosed which uses a first stage formed by an inertial vane separator (32), a second stage formed by a coalescer stage (36) and a third stage formed by an inertial vane separator (34). The coalescer stage (36) is canted from vertical relative to the air flow direction which increases the surface area for air flow, increases the drainage rate of water from the coalescer section and provides an improved air flow distribution to the second inertial vane separator with higher velocities near the top of the second inertial vane separator. The inertial vane separators (32, 34) have flush cavities to reduce obstruction to air flow and have vanes that are greater than three inches in wavelength and spaced greater than one inch apart. The marine separator is capable of flow velocities of 50 standard feet per second.

13 Claims, 4 Drawing Sheets

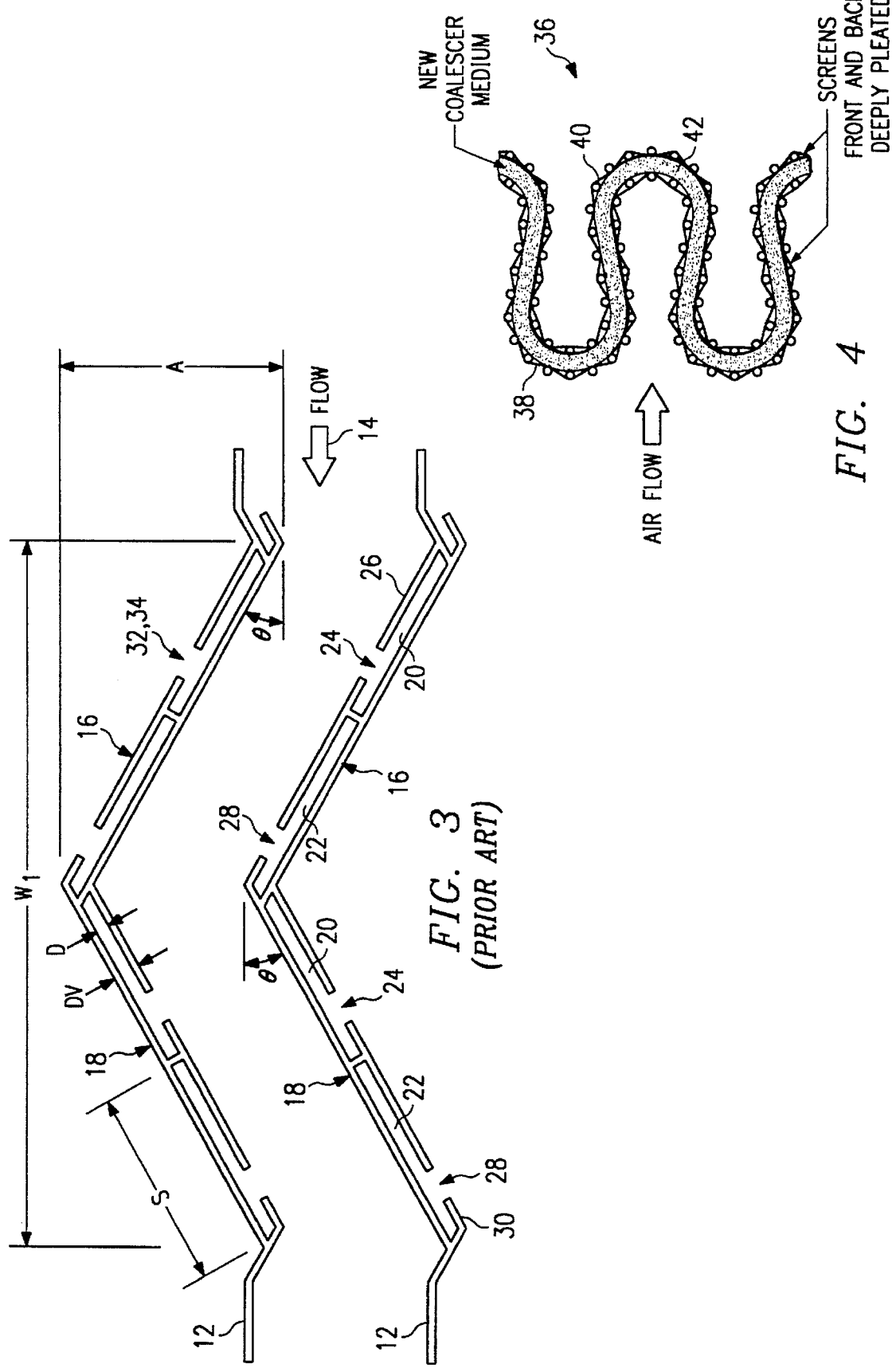

HIGH CAPACITY MARINE SEPARATOR

CROSS REFERENCE TO RELATED APPLICATIONS

This is a continuation of U.S. patent application Ser. No. 08/220,050 filed Mar. 30, 1994 now abandoned.

TECHNICAL FIELD OF THE INVENTION

This invention relates to a separator for separating moisture and other contaminants from an air stream provided to a marine power plant.

BACKGROUND OF THE INVENTION

If the air provided to a power plant on board ship for combustion has been cleansed of moisture and other contaminants, the power plant service life and reliability will be enhanced. This is true of gasoline and diesel engines, and particularly gas turbine engines. In the past, moisture and contaminants have been removed by a moisture separator, one configuration of which includes an inertial vane separator followed by a moisture coalescer which, in turn, is followed by a second inertial vane separator.

Inertial vane separators function to provide a tortuous path for the air flow to force separation of the moisture from the air by turning the direction of the air so quickly that the moisture is separated by the effects of inertia and flows down the vanes of the separator for disposal. The coalescer is formed of a porous mat of fibrous material which acts to coalesce small droplets, which are difficult to separate by inertia. These coalescers are usually fibrous and use woven or nonwoven materials of fine threads typically between 0.010 and 0.001 inch in diameter. The second inertial vane separator acts to separate the coalescer droplets by inertial effects and, since the coalesced droplets are usually greater than 50 microns in diameter, this is easily achieved.

Prior marine moisture separator designs such as those supplied by the Assignee of the present application, Peerless Manufacturing Company of Dallas, Tex., have been limited to air velocities in the range of from about 5 to 30 standard feet per second (sfps). Higher velocities have not been practical because of excessive pressure loss, droplet shattering and subsequent re-entrainment of water droplets. With these limitations, the moisture separator must often be quite a large structure to provide sufficient air flow for power plant operation. The need exists for an enhanced moisture separator system which is capable of separating moisture and contaminants from the air flow at velocities higher than that previously possible. This would allow for a reduced size separator configuration and use of higher performance marine power plants. Thus, the present invention provides the advantages of a more efficient removal of water, allows higher velocities to be used, and permits use of a lighter weight separator.

SUMMARY OF THE INVENTION

In accordance with one aspect of the present invention, a high capacity marine separator is provided to separate moisture from air flowing in a flow direction. The marine separator includes a coalescer stage which is canted with respect to the air flow direction. Preferably, the angle of cant is between about 10° and about 45° relative to vertical when the air flow is horizontal. In accordance with another aspect of the invention, the coalescer stage includes a pair of corrugated screens which confine a fibrous material therebetween. The fibrous material preferably has a diameter less than 0.001 inch.

In accordance with another aspect of the present invention, the marine separator includes an inertial vane separator upstream of the coalescer stage. A second inertial vane separator can be provided downstream of the coalescer stage. The use of a canted coalescer stage provides a greater surface area for air flow which reduces air velocity and pressure loss. Further, the canted coalescer stage increases the drainage rate of water which collects in the coalescer because of the downward air flow shear at the face of the coalescer. Further, the coalescer stage improves the air flow distribution in the second inertial vane separator as the air flow velocities near the upper portions of the second inertial vane separator are larger than the velocities near the bottom which allows greater drainage rates of moisture caught in the second inertial vane separator.

With respect to another aspect of the present invention, a marine separator is provided to separate moisture from air flowing in an air flow direction. The marine separator includes a first inertial vane separator, a coalescer downstream of the first inertial vane separator and a second inertial vane separator downstream of the coalescer. Each of the inertial vane separators includes a first member extending at a predetermined angle relative to the direction of air flow from a leading edge to a trailing edge. The first member having an upstream cavity formed therein and a downstream cavity formed therein. A second member extends from the trailing edge of the first member at a second predetermined angle relative to the direction of air flow, the second member having an upstream cavity formed therein, and a downstream cavity formed therein. A first side of the first member has first and second longitudinal slots formed therein perpendicular the direction of air flow. Each of the slots opens into one of the cavities. A second side of the second member has first and second slots formed therein extending perpendicular the direction of air flow, each of said slots opening into a cavity in the second member.

In accordance with another aspect of the present invention, the coalescer stage is canted relative to the air flow direction.

DESCRIPTION OF THE DRAWINGS

For a more complete understanding of the present invention and the advantages thereof, reference is now made to the following description taken in conjunction with the accompanying drawings in which:

FIG. 3 is a horizontal cross section of the inertial vane separator used in the present invention;

FIG. 4 is a horizontal cross-sectional view of the coalescer used in the design;

DETAILED DESCRIPTION

Figure 1:
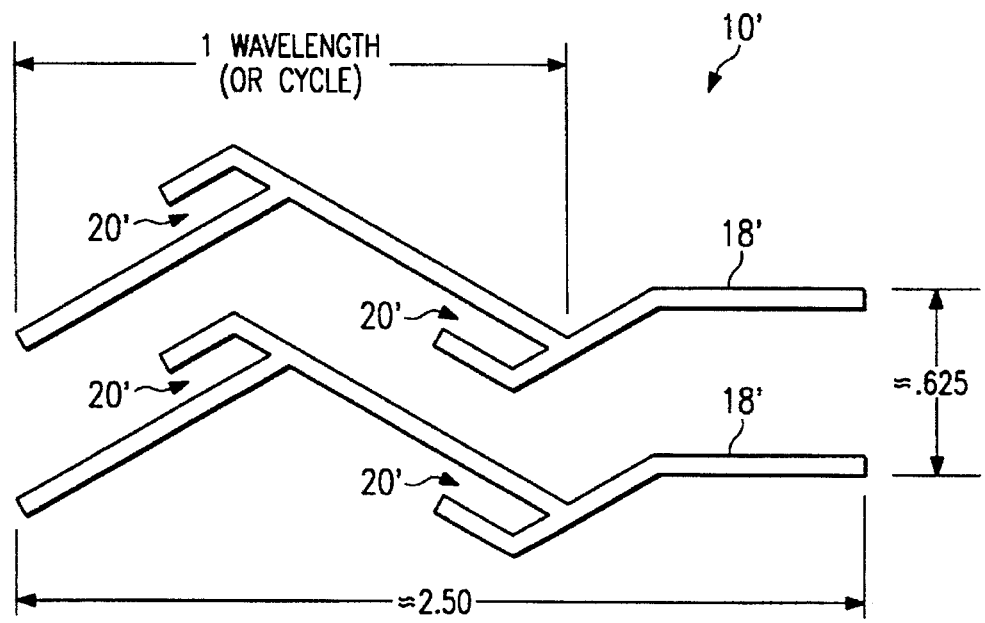
FIG. 1 is a horizontal cross section of a conventional vane separator used in marine systems.
Figure 2:
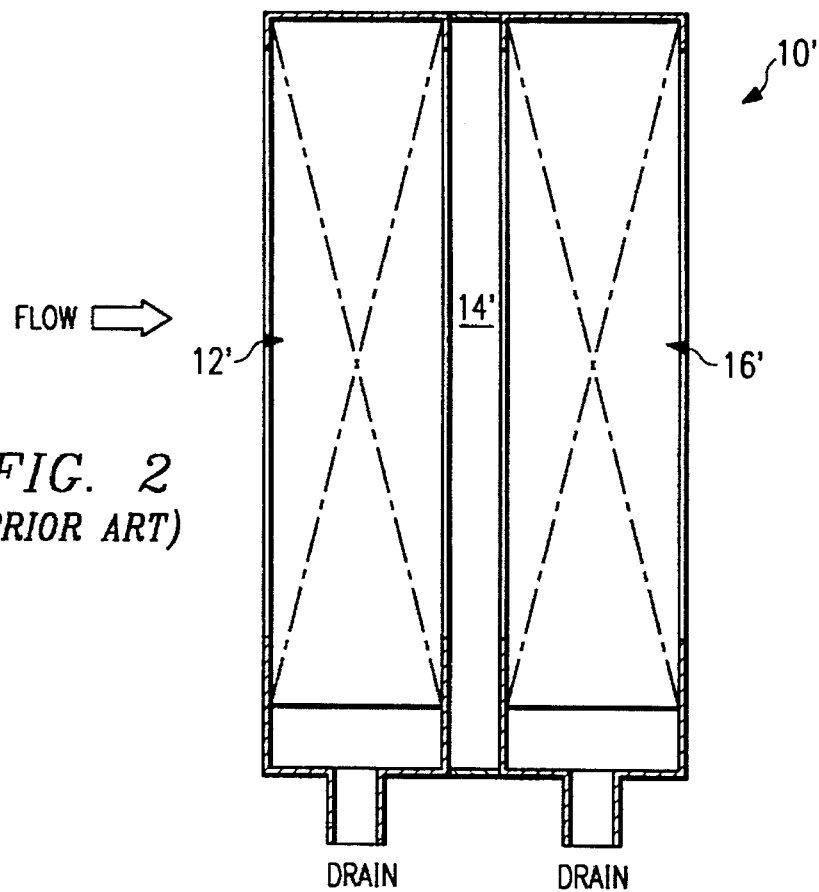
FIG. 2 is a horizontal cross section of a conventional moisture separator used in a marine environment.
Figure 5:
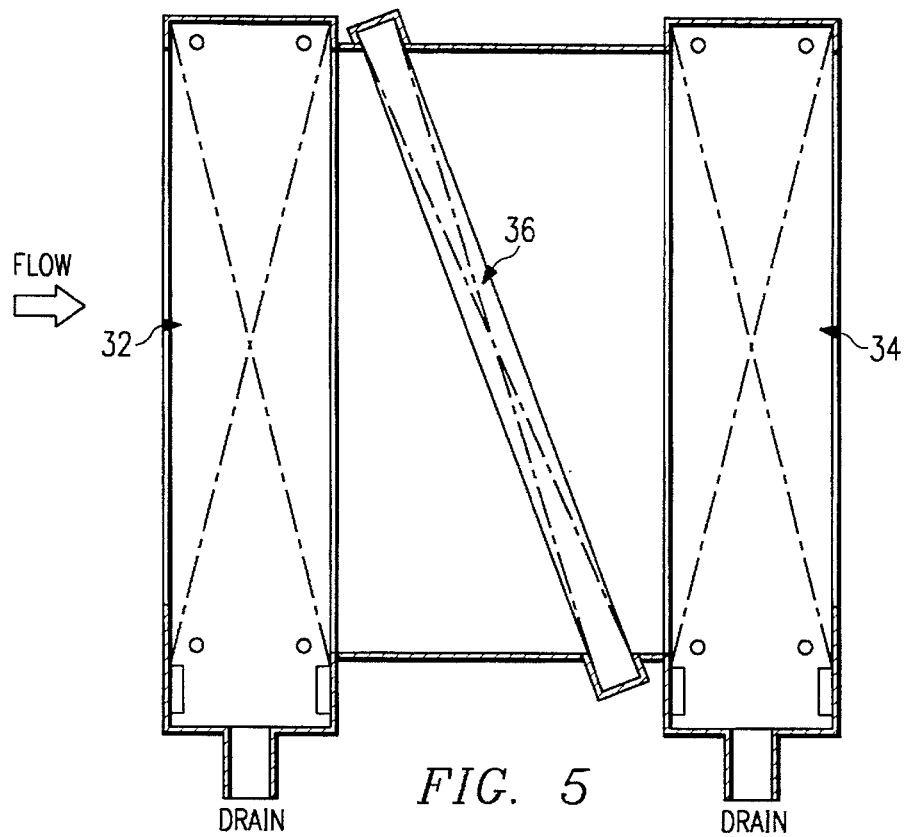
FIG. 5 is a vertical cross-sectional view of the arrangement of the coalescer and first and second inertial vane separators.

With reference now to the drawings, wherein like reference characters designate like or similar parts throughout the several views, FIGS. 1 and 2 illustrate a conventional marine moisture separator 10' which has a first stage formed of an inertial vane separator 12' a second stage formed of a moisture coalescer 14' and a second inertial vane separator 16'. Vane separators of this type are sold as P35 and P25 vanes, respectively by Peerless Manufacturing Company of Dallas, Tex. As seen in FIG. 1, the conventional vane separators 12' and 16' typically have a spacing between the individual vanes 18' of less than one inch and a wavelength of less than three inches. The separators also have pockets 20' which obstruct the air flow to some extent, causing the air to contract and expand to pass by a pocket.

The moisture coalescer 14' is usually fibrous and has woven or nonwoven materials of fine threads having a diameter within the range of from 0.010 to 0.001 inch. The moisture separator of this type is limited to superficial or face air velocities in the range of five to thirty standard feet per second. Higher velocities are not practical because of excessive pressure loss, inadequate sea water handling capacities at these velocities, and droplet shattering and subsequent re-entrainment of the shattered salt water drops.

With reference now to FIGS. 3–6, an improved moisture separator 30 is illustrated. The operating face velocity of the improved moisture separator 30 is in the range from about 10 to 50 standard feet per second, yielding a much higher air capacity than found in prior designs. At these operating velocities, the separator 30 is capable of adequate liquid drainage capacity and acceptable pressure drop.

With reference to FIG. 3, the improved moisture separator 30 can be seen to include a first, upstream inertial vane separator 32 and a substantially identical downstream and second inertial vane separator 34. The vanes are constructed in accordance with the teachings of U.S. Pat. No. 5,104,431 issued Apr. 14, 1992, said patent being hereby incorporated by reference in its entirety herein. More specifically, the inertial vane separators 32 and 34 include a plurality of vanes 12 which are extremely high performance vanes relative to that previously in existence, which permits the separator to be made more compact for a given performance requirement.

The vanes are formed of an aluminum extrusion which defines a series of box-like members 16 and 18 which extend generally along the direction of air flow but at a predetermined angle relative thereto. Each of the members is hollow and defines at least two cavities, an upstream cavity 20 and a downstream cavity 22 which extend the entire height of the vanes. A longitudinal upstream opening or slot 24 extends through a first side 26 of the member into the upstream cavity. A similar slot 28 opens into the downstream cavity.

A second side of the member, on a side opposite that of the first side, includes similar slots opening into similar cavities. As can be seen in FIG. 3, as air laden with moisture flows in the direction of the arrow, some of the air will enter the cavities of the member, where the convoluted and multi-directional air flow which results separates out the denser moisture and drains the separated moisture along the cavities to the bottom of the separator. Similarly, air flow passing the first member will impinge upon the similar slots in the member of the adjacent vane, which will further agitate the air flow for moisture separation.

It can be seen that each cavity has a transverse thickness or depth D which generally is perpendicular to the direction of air flow. Preferably, this dimension D is less than $\frac{1}{45}$ of the vane wavelength $W_1$ and less than $\frac{1}{14}$ of the peak-to-peak amplitude A of the vane while still providing drainage space amounting to greater than 50% of the vane cross-sectional area. However, the dimension D should not be too small so as create surface tension concerns for draining separated fluids along the cavities.

The drainage space referred to is effectively the volume of each cavity, divided by the height H. This volume is defined by the length S of each cavity, which generally lies parallel the direction of air flow, the depth D and the height H of the vane. The vane cross sectional area would be the width $W_1$ of the vane times the thickness DV of the vane. The vanes are preferably greater than three inches in wavelength and are spaced greater than one inch apart. Preferably, only two members (baffles) or one wavelength per vane is used as shown in FIG. 3.

These relationships allow an increase in the speed of air flow through the vanes without re-entrainment of separated fluids, thus increasing the capacity of the vanes over prior known designs. With such construction, the vanes will provide for a contraction of the flow necessary to pass through the vane of less than 33%, while maintaining adequate tortuosity to separate droplets as small as 10 microns in diameter with 95% efficiency.

After passing through the first inertial vane separator, the air flow will pass through a coalescer stage 36. The coalescer stage includes a first corrugated screen 38, a second corrugated screen 40 and fibrous material 42 confined between the two corrugated screens 38 and 40. The corrugated screens pleat the fibrous material to minimize pressure loss. The screens may be flat, however, flat screens are less preferred because they usually result in a higher pressure drop.

Figure 6:
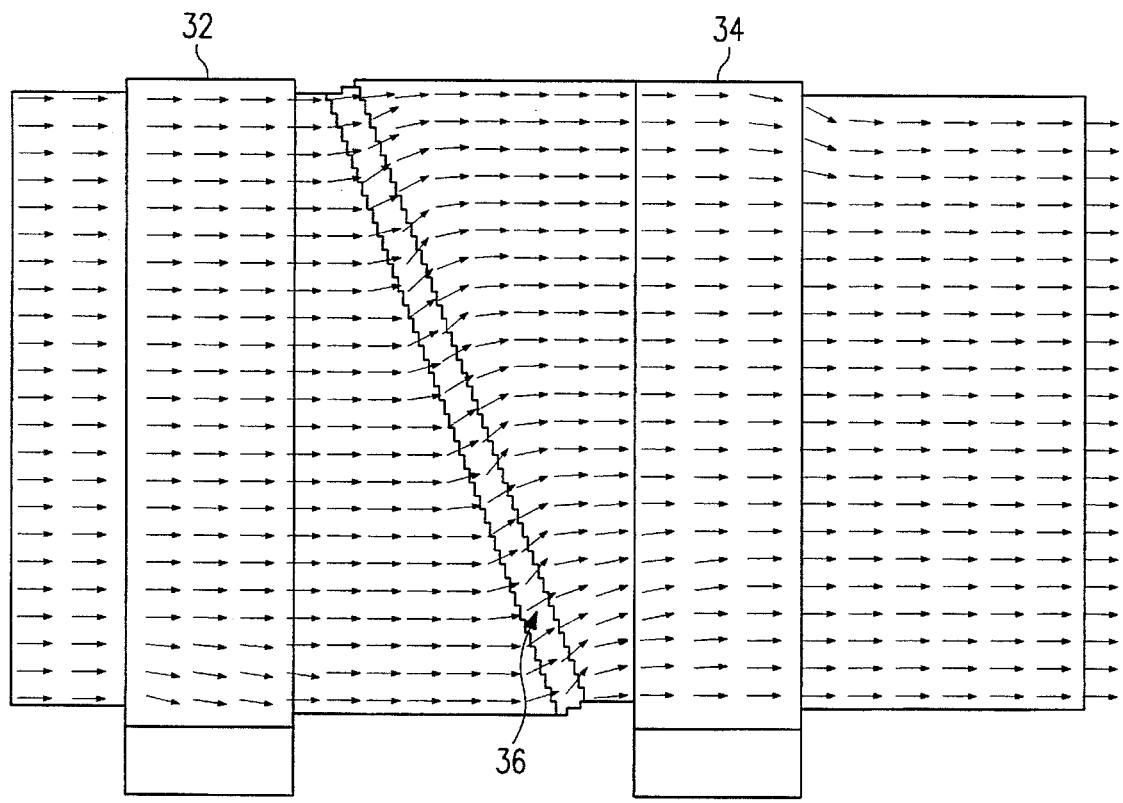
FIG. 6 is a vertical cross section illustrating the air flow distribution to the second inertial vane separator.

A significant advantage of the present invention is the fact that the coalescer stage 36 is canted relative to the air flow direction, as best seen in FIG. 6. More specifically, the lower end of the coalescer stage is further downstream than the upper end. The canted coalescer provides more surface area for air flow, thereby reducing air velocity and pressure losses through the coalescer, increasing the drainage rate of the water by downward air flow shear at the face of the coalescer, and decreasing re-entrainment rates of sea water. The coalescer is preferably canted at an angle of between about 10° to about 45° from the vertical with the air flow horizontal. Preferably the angle of cant is between about 25° to about 35°.

The coalescer is preferably constructed utilizing a fibrous material having randomly oriented fibers with diameters of 0.001 inch or less. The preferred fibrous material is a nonwoven polyester. Other materials suitable for use as the fibrous material include white fibrous material. (white fibrous material is a non-woven fibrous medium) Some of the fibrous material can have a diameter above 0.001 inch as long as the majority, more than 50%, of the fibers or the effective quantity of fibers after size and configuration are taken into account, have a diameter of 0.001 inch or less. The corrugated screens 38 and 40 are preferably formed of aluminum or stainless steel.

The coalescer is preferably constructed such that the pressure drop across the coalescer as measured at midstream is less than about 4.0 inches of water. Pressure drop will be effected primarily by the thickness and density of the coalescer fibrous material and the angle of the coalescer stage to the air flow. The configuration of the screens supporting the fibrous material can also affect the pressure drop. The coalescer can be constructed in any desired manner. The particular construction chosen as well as the angle of cant will affect the pressure drop experienced.

In general, it has been found that an angle of cant of between about 25° and about 35° degrees from vertical for horizontal air flow produces good water removal and water flow to the lower end of the coalescer. Depending on the construction of the coalescer and its orientation, pressure drop of less than about four inches of water can be obtained. Thus, the coalescer should be constructed such that the coalescer, when oriented, provides good flow characteristics for the removal of water and also does not produce excessive pressure drop. It has been found that a coalescer constructed from a fibrous mat material about ⅜ inch in thickness comprised of nonwoven fibers of polyester having an average diameter of about 0.00063 inches which was compressed between two corrugated screens to a thickness of about ⅛ inch provided good operating characteristics when positioned at a 30° cant.

The correlation between the pressure drop and the angle of cant for angles from 0° to 45° for a particular coalescer construction can be determined utilizing the following formula:

$$\Delta P = K_1 \left( \frac{Q^* \cos(\Theta)}{h^* w} \right) + K_2 \left( \frac{Q^* \cos(\Theta)}{h^* w} \right)^2$$

where:
ΔP=Pressure Drop
Θ=Angle of Coalescer—measured from the longitudinal axis of flow
$K_1$, $K_2$=Constants
Q=Gas Flow Rate
h=Duct Height
w=Duct Width The formula is based upon an increase in the length of the coalescer as it is tilted forward. The K values in the above equation can be determined experimentally by the following procedure.

Make sure the coalescer unit is completely dry and obtain the barometric pressure. Note dimensions and face area of coalescer. Provide manometers in the middle of the air flow upstream and downstream of the coalescer. Adjust the manometers liquid level so that it reads zero inches water column (w.c.) with zero air flow. For testing separation internals in the duct configuration, the pressure drop will be found using trail-tail type static pressure probes upstream and downstream of the test unit. The upstream probe should be placed between one and three feet in front of the test unit at the center of the duct and the downstream probe should be placed between one and three feet downstream of the test unit, also at the center of the duct. The air flow should then be regulated to attain the desired apparent standard face velocity. Allow the manometer liquid levels to reach equilibrium before reading the pressure drop. Record the annubar, duct pressure, flow temperature, and the pressure drop readings. Repeat the tests with different apparent standard face velocities and continue testing until the drop is known for at least eight to ten flow rates. From the data obtained, it is then possible to draw a curve of pressure drop vs. flow velocity. For fully developed turbulent flow, as in nozzles and vane separator units, the pressure drop vs. velocity graph should result in a straight line when plotted on log-log paper. A coefficient of resistance (K-factor) can be calculated from the following equations:

$$DP = \frac{\rho^* V^2 *(0.1922)}{2^* g_c}$$

-continued
$$K = \frac{\Delta P}{DP}$$

ρ=Standard density of Air=0.0763 (lbm/ft³)
V=Standard air velocity (ft/sec)
0.1922=Conversion factor (PSF→inches w.c.)
$g_c$=Gravitational constant=

$$32.2 \frac{lb_m - ft}{lb_f - \text{Sec}^2}$$

ΔP=Measured drop pressure (inches w.c.)
DP=Dynamic pressure (inches w.c.)
K=K-factor resistance coefficient (dynamic heads)

If the selected coalescer configuration does not meet the desired performance requirements, the configuration of the coalescer may be changed. In general, a coalescer which has a fibrous mat of from about 0.25 inch to about 0.5 inches thick having fibers with a diameter of from about 0.001 inch to about 0.0001 inch has been found to provide useful operating characteristics.

The use of a canted coalescer stage has a number of advantages. The canted coalescer stage will provide a greater effective surface area for air flow, thus reducing air velocity and pressure loss through the coalescer stage. Further, there is an increase in the drainage rate of the water which collects in the coalescer. This is the result of the downward air flow shear at the face of the coalescer which drives the coalesced water downward. Further, with reference to FIG. 6, the air flow distribution to the second inertial vane separator 34 is improved. The ideal distribution is not a uniform air velocity across the entire vane separator. In actuality, it is desirable to have somewhat higher velocities near the top portion of the second inertial vane separator 34 than at the lower portion. This distribution is established by the canted coalescer stage as shown in FIG. 6. A feature of this particular air flow distribution is the fact that a greater drainage rate of sea water caught by the second inertial vane separator is permitted without re-entrainment as the bulk of the moisture will collect at the lower portion of the second inertial vane separator where the air flow velocity is minimized, preventing significant re-entrainment.

The screens supporting the fibrous mat material are preferably made from a corrosion resistance material such as fiberglass, aluminum, stainless steel or plastic. The screens also should have sufficient open space to not impede the air flow.

Figure 7:
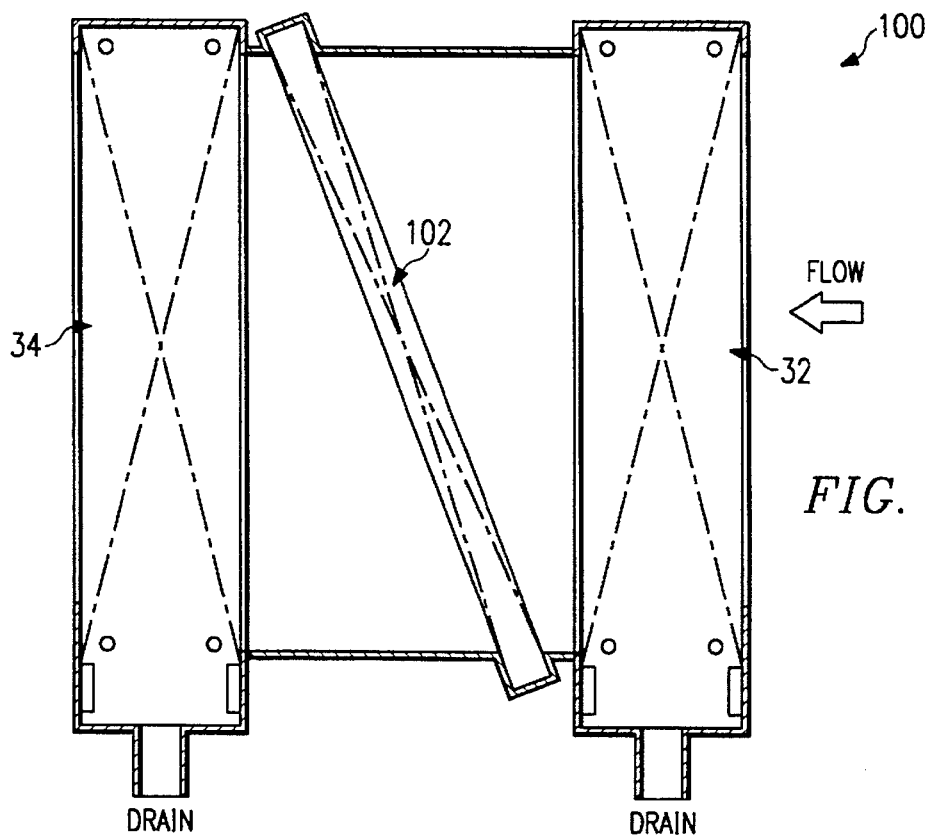
FIG. 7 is a side view of a modified inertial vane separator showing a reverse canted coalescer.

FIG. 7 shows a modified marine separator 100 which is substantially identical to the marine separator 30 with the exception that the coalescer stage 102 is canted in the opposite direction relative to the air flow as in separator 30. This would be a less desirable configuration as the cant of the coalescer stage would cause the air flow to resist downward movement of moisture particles on the upstream face of the coalescer stage, but does have the advantage of increased flow surface area.

Figure 8:
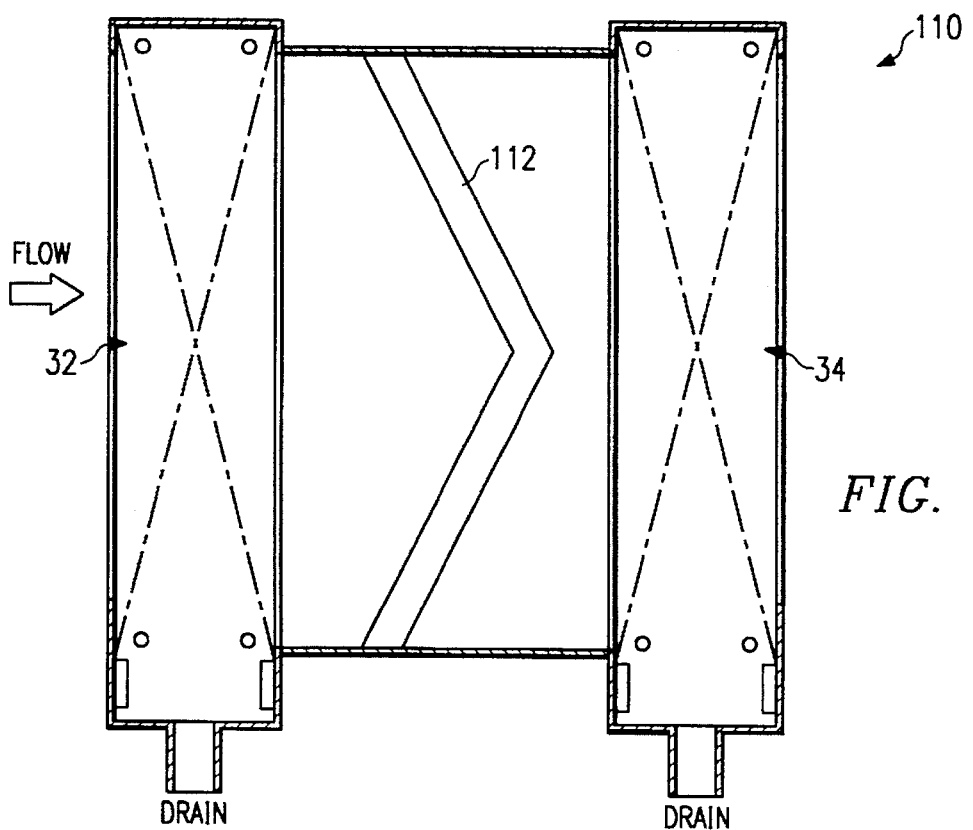
FIG. 8 is a side view of a second modified inertial vane separator showing a modified coalescer.

FIG. 8 shows yet another modified marine separator 110 with a V-shape coalescer stage 112. Again, the configuration would be less desirable than separator 30, but does have the advantage of increased surface area and a portion of the coalescer stage canted to drive moisture toward the bottom of the separator. Other configurations are possible, such as multiple V-shapes, L-shapes, etc. Also, the coalescer can be mounted in the air flow skewed from the air flow direction at an angle to the horizontal so that one vertical side of the coalescer is more than the other vertical side.

While a single embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope and spirit of the invention.

We claim:

1. A method for separating moisture from air flow on board a marine vessel comprising the steps of:

flowing air through a high capacity marine separator mounted on the marine vessel at an air flow velocity between about 10 to 50 standard feet per second, the high capacity marine separator having a first inertial vane separator including vanes, a coalescer stage and a second inertial vane separator including vanes, the coalescer stage being canted relative to the air flow direction at an angle between about 10° and about 45° from perpendicular the air flow direction.

2. The method of claim 1 further comprising the step of coalescing moisture from the air flow in the coalescer stage with a pressure drop of less than about four inches of water across the coalescer stage.

3. The method of claim 1 further comprising the step of canting the coalescer stage so that downward air flow shear on the front face of the coalescer stage drives moisture to the bottom of the coalescer stage.

4. The method of claim 1 further comprising the step of forming the coalescer stage from a fibrous mat material about ⅜ inch in thickness comprised of non-woven fibers of polyester having an average diameter of about 0.00063 inches compressed between two corrugated screens to a thickness of about ⅛ inch.

5. The method of claim 1 further comprising the step of canting the coalescer stage to create higher velocities near the top portion of the second inertial vane separator then at the lower portion.

6. The method of claim 1 further comprising the step of passing air over flush pockets in the first inertial vane separator.

7. The method of claim 1 further comprising the step of canting the coelescer stage for a selected pressure drop at an angle determined by the formula:

$$\Delta P = K_1 \left( \frac{Q^*\cos(\Theta)}{h^*w} \right) + K_2 \left( \frac{Q^*\cos(\Theta)}{h^*w} \right)^2.$$

8. The method of claim 1 wherein the step of flowing air through the high capacity marine separator includes the step of contracting the flow less than 33% through the first and second inertial vane separators while maintaining adequate tortuosity to separate droplets as small as 10 microns in diameter with 95% efficiency.

9. The method of claim 1 wherein the step of flowing air through the high capacity marine separator further comprises the step of flowing air past a first member and a second member in each of said first and second inertial vane separators, the first member extending at a predetermined angle relative to the air flow direction from a leading edge to a trailing edge, said first member having an upstream cavity formed therein, and a downstream cavity formed therein, the second member extending from the trailing edge of the first member at a second predetermined angle relative to the air flow direction, said second member having an upstream cavity formed therein, and a downstream cavity formed therein, the first side of said first member having first and second longitudinal slots formed therein perpendicular to the direction of air flow, each of the said slots opening into one of said cavities, a second side of said second member having first and second slots formed therein extending perpendicular the direction of the air flow, each of said slots opening into a cavity in said second member.

10. A method for separating moisture from air flow on board a marine vessel comprising the steps of:

flowing air through a high capacity marine separator horizontally mounted on the marine vessel at an air flow velocity between about 10 to 50 standard feet per second, the high capacity marine separator having a first inertial vane separator including vanes, a coalescer stage and a second inertial vane separator including vanes, the coalescer stage being canted relative to the air flow direction at an angle between about 45° and 80° from the air flow direction, the second inertial vane separator designed for horizontal flow, the flow through the coalescer stage redirecting air flow toward the top of the second inertial vane separator to separate air flow from liquid re-entrainment, liquids coalesced and re-entrained in the air flow downstream of the coalescer stage being collected in the bottom portion of the second inertial vane separator.

11. The method of claim 10 wherein the step of flowing air through the high capacity marine separator horizontally includes the step of discharging the air from the second inertial vane separator with higher velocity toward the top of the second inertial vane separator and lower velocity toward the bottom of the second inertial vane separator.

12. The method of claim 10 wherein the step of flowing air through the high capacity marine separator further includes the step of passing air flow over flush pockets in the first and second inertial vane separators.

13. A method for separating moisture from air flow on board a marine vessel comprising the steps of:

flowing air horizontally into a high capacity marine separator mounted on the marine vessel at an air flow velocity between about 10 to 50 standard feet per second, the high capacity marine separator having a first inertial vane separator including vanes utilizing flush pockets designed for passage of air horizontally, a coalescer and a second inertial vane separator including vanes having flush pockets designed for horizontal air flow, the coalescer being canted relative to the air flow direction at an angle between about 45° to about 80° from horizontal, the air flow impacting upon the upstream face of the coalescer being horizontal and being redirected by the coalescer to concentrate the air flow at the top of the second inertial vane separator, the coalescer causing formation of large coalesced drops, the horizontal air flow impacting on the upstream face of the coalescer enhancing vertically downward movement of moisture separated from the air flow at the upstream face of the coalescer, the upwardly directed air flow downstream of the coalescer having a reduced effect on the movement of the large coalesced drops from the coalescer to the bottom of the second inertial vane separator.

* * * * *